United States Patent
Fujita et al.

(10) Patent No.: US 11,613,094 B2
(45) Date of Patent: Mar. 28, 2023

(54) METHOD FOR MANUFACTURING CARDBOARD SHEET USING PREDICTION MODEL OF SHEET WARPAGE WITH DELETION OF PRESCRIBED INFORMATION

(71) Applicant: MITSUBISHI HEAVY INDUSTRIES MACHINERY SYSTEMS, LTD., Hyogo (JP)

(72) Inventors: Takumi Fujita, Tokyo (JP); Koki Tateishi, Tokyo (JP); Hideki Mizutani, Hyogo (JP); Akira Ogino, Hyogo (JP); Koshi Tanimoto, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 194 days.

(21) Appl. No.: 16/964,215

(22) PCT Filed: Jan. 31, 2018

(86) PCT No.: PCT/JP2018/003211
§ 371 (c)(1),
(2) Date: Jul. 23, 2020

(87) PCT Pub. No.: WO2019/150487
PCT Pub. Date: Aug. 8, 2019

(65) Prior Publication Data
US 2021/0039348 A1    Feb. 11, 2021

(51) Int. Cl.
*G05B 13/04* (2006.01)
*B31F 1/28* (2006.01)
(Continued)

(52) U.S. Cl.
CPC .......... *B31F 1/2831* (2013.01); *B31F 1/2804* (2013.01); *B31F 1/284* (2013.01);
(Continued)

(58) Field of Classification Search
CPC ...... B31F 1/2831; B31F 1/2804; B31F 1/284; B31F 1/24; D21F 13/00; G05B 13/048;
(Continued)

(56) References Cited

U.S. PATENT DOCUMENTS

| 6,445,963 B1 * | 9/2002 | Blevins ................. G05B 11/32 706/14 |
| 2006/0100721 A1 * | 5/2006 | Piche ................... G05B 13/027 700/47 |

(Continued)

FOREIGN PATENT DOCUMENTS

| EP | 1902833 A1 | 3/2008 |
| JP | 3735302 B2 | 1/2006 |

(Continued)

OTHER PUBLICATIONS

Wang, David, "Robust Data-Driven Modeling Approach for Real-Time Final Product Quality Prediction in Batch Process Operation," IEEE Transactions on Industrial Informatics, vol. 7, No. 2, May 2011, pp. 371-377—7 pages.

(Continued)

*Primary Examiner* — Kenneth M Lo
*Assistant Examiner* — Jonathan Michael Skrzycki
(74) *Attorney, Agent, or Firm* — Hauptman Ham, LLP

(57) ABSTRACT

A cardboard sheet manufacturing system includes an information editing unit storing production state information, operation state information, and warping state information as acquisition information in a storage unit, the information editing unit deleting, in a case where the stored acquisition information includes prescribed information to be deleted, (Continued)

the information to be deleted from the storage unit and outputting the acquisition information stored in the storage unit as editing information. The system also includes an editing information storage unit storing the editing information output from the information editing unit, a prediction model calculation unit calculating a prediction model of the warping state based on the editing information stored in the editing information storage unit; and a control table update unit updating a target value of a control value of a control element in the cardboard sheet manufacturing apparatus, based on the prediction model.

9 Claims, 15 Drawing Sheets

(51) Int. Cl.
*D21F 13/00* (2006.01)
*G05B 19/418* (2006.01)

(52) U.S. Cl.
CPC ............ *D21F 13/00* (2013.01); *G05B 13/048* (2013.01); *G05B 13/04* (2013.01); *G05B 19/41865* (2013.01)

(58) Field of Classification Search
CPC ... G05B 13/04; G05B 19/41865; Y02P 90/02; B65B 57/02; B32B 11/06
See application file for complete search history.

(56) References Cited

U.S. PATENT DOCUMENTS

2008/0077267 A1* 3/2008 Ishibuchi ................ B31F 1/284
700/89
2008/0281557 A1 11/2008 Emigholz

FOREIGN PATENT DOCUMENTS

JP 2007112023 A * 5/2007 ................ B31F 1/24
JP 2007112023 A 5/2007

OTHER PUBLICATIONS

Extended European Search Report for European Application No. 18903831.8 dated Nov. 25, 2020—10 pages.

* cited by examiner

FIG. 4

| ITEM | SPEED |
|---|---|
| CONDITION | AMOUNT OF 20-SECOND TEMPERATURE CHANGE EXCEEDING 2°C |
| TEMPERATURE | AMOUNT OF 20-SECOND WARPING CHANGE (ABSOLUTE VALUE) EXCEEDING 0.5 mm |
| WARPING AMOUNT | FOR 20 SECONDS AFTER CHANGE IN BASIS WEIGHT |
| BASIS WEIGHT | FOR 20 SECONDS FROM TIME WHEN MOVING AVERAGE VALUE OF SPEED DIFFERENCE (FOR 20 SECONDS) HAS CHANGED BY ±20 [m/min] |

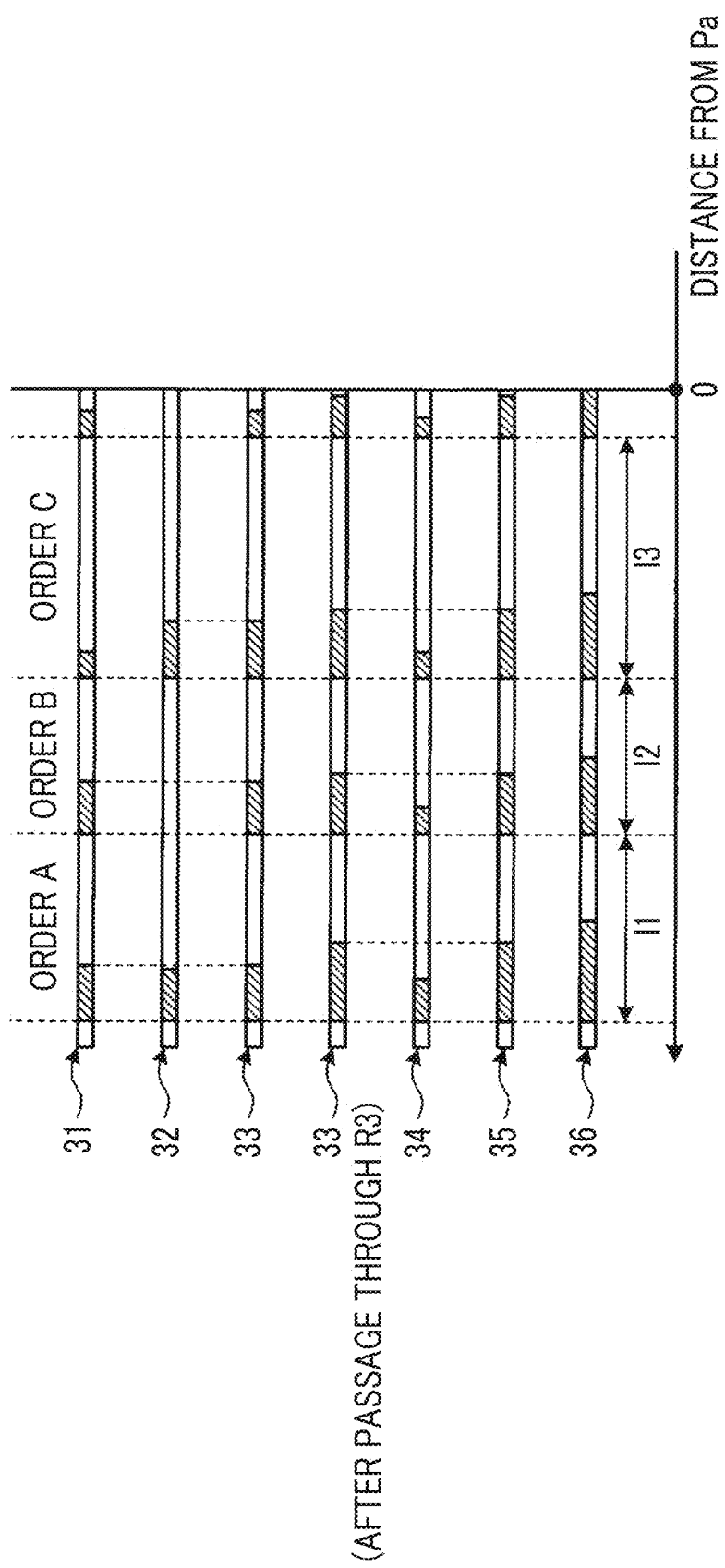

FIG. 9

| | PRODUCTION STATE INFORMATION | | OPERATION STATE INFORMATION | WARPING STATE INFORMATION |
|---|---|---|---|---|
| | BASIS WEIGHT | PAPER WIDTH | WINDING AMOUNT | WARPING AMOUNT |
| ACTUAL DATA SET 1 | 100 | 100 | θ1 | 0.5 |
| ACTUAL DATA SET 2 | 120 | 150 | θ2 | 0.6 |
| ACTUAL DATA SET 3 | 160 | 190 | θ3 | 0.4 |
| ACTUAL DATA SET 4 | 190 | 220 | θ4 | 0.2 |
| ACTUAL DATA SET 5 | 210 | 250 | θ5 | 0.3 |

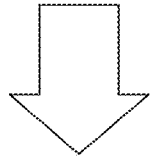

| | PRODUCTION STATE INFORMATION | | OPERATION STATE INFORMATION | WARPING STATE INFORMATION |
|---|---|---|---|---|
| | BASIS WEIGHT | PAPER WIDTH | WINDING AMOUNT | WARPING AMOUNT |
| ACTUAL DATA SET 1 | 100 | 100 | θ1 | 0.5 |
| | | | | |
| ACTUAL DATA SET 3 | 160 | 190 | θ3 | 0.4 |
| ACTUAL DATA SET 4 | 190 | 220 | θ4 | 0.2 |
| ACTUAL DATA SET 5 | 210 | 250 | θ5 | 0.3 |

FIG. 14
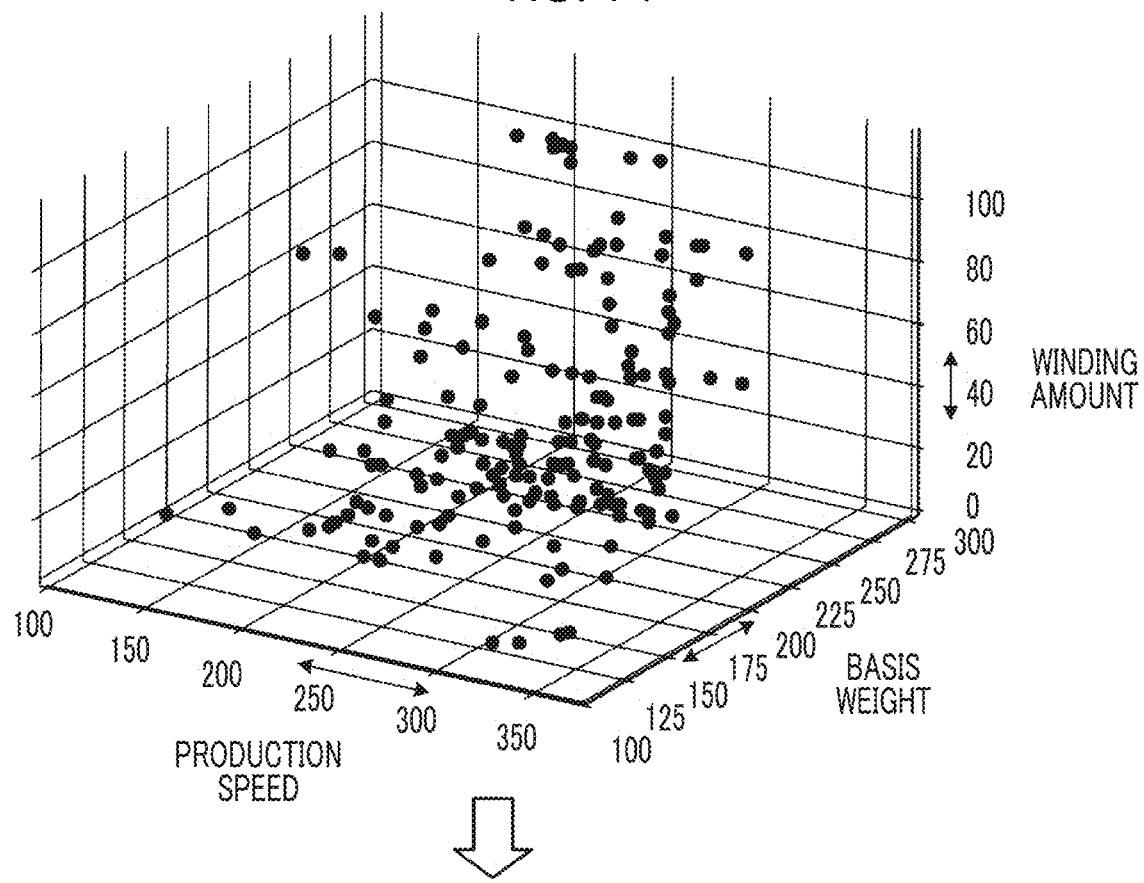
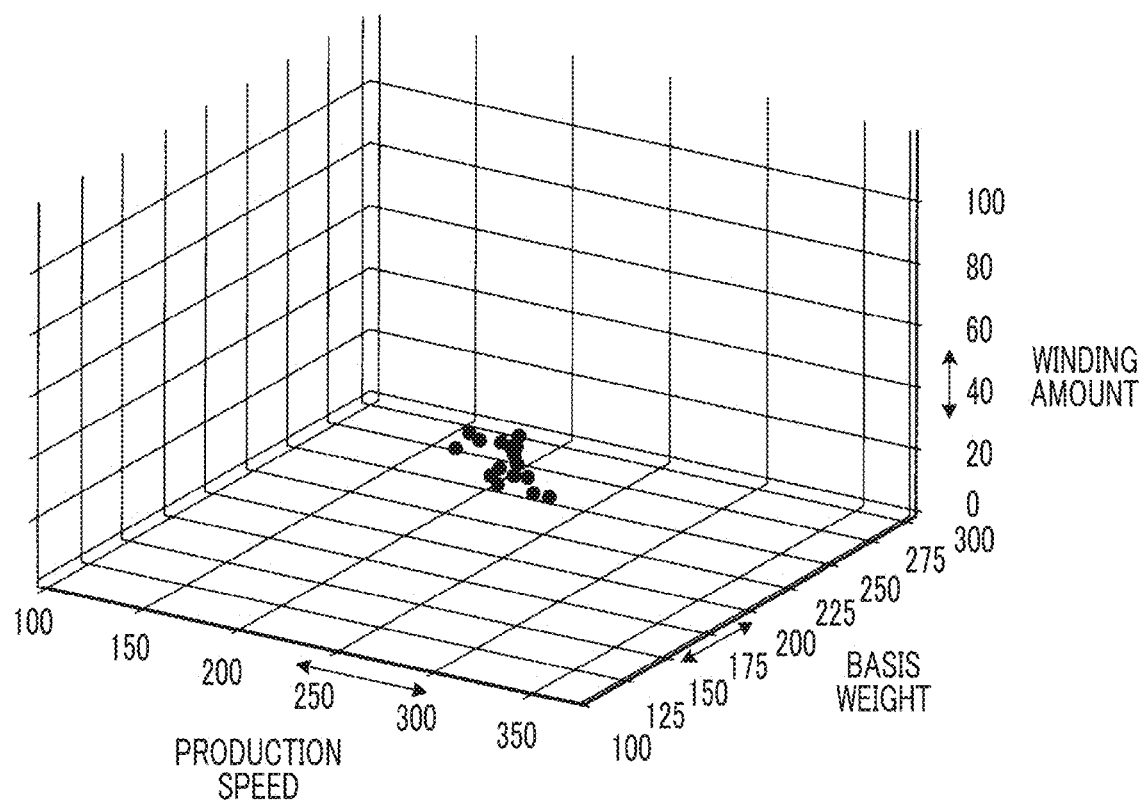

METHOD FOR MANUFACTURING CARDBOARD SHEET USING PREDICTION MODEL OF SHEET WARPAGE WITH DELETION OF PRESCRIBED INFORMATION

RELATED APPLICATIONS

The present application is a National Phase of International Application Number PCT/JP2018/003211 filed Jan. 31, 2018.

TECHNICAL FIELD

The present invention relates to a system for manufacturing a cardboard sheet.

BACKGROUND ART

A cardboard sheet is manufactured by a single-faced web being produced by a stepped medium being glue-bonded to one liner (top liner) and the other liner (bottom liner) being bonded to the medium side of the single-faced web. In this manufacturing process, the sheets of the top liner, the bottom liner, the single-faced web, and the cardboard sheet are respectively heated by preheaters such as a top liner preheater, a bottom liner preheater, and a single-faced web preheater or a double facer. In addition, the sheets are glued by a single facer or a glue machine. The completed cardboard sheet is warped when the heating amount or the gluing amount is not an appropriate value at that time.

Accordingly, in the cardboard sheet manufacturing apparatus of the related art, warping suppression is performed by various control elements exemplified by a preheater winding amount being feedforward-controlled by matrix control and based on production states such as the paper width and basis weight of the sheet. In the matrix control, the initial control values of various control values are determined in accordance with a pre-control table stored in advance and production states, and thus various control values can be set to appropriate values in accordance with production states and warping suppression can be performed.

Patent Literature 1 discloses a cardboard sheet warping straightening system in which such matrix control is improved. Although the initial control values of various control values are set by matrix control and based on production states in the warping straightening system disclosed in Patent Literature 1, the warping amount of the cardboard sheet is detected visually by an operator or by a CCD camera or a distance sensor and various control values are corrected by feedback control and based on the detection result.

CITATION LIST

Patent Literature

Patent Literature 1: Japanese Patent No. 3735302

SUMMARY OF INVENTION

Technical Problem

However, in the cardboard sheet warping straightening system disclosed in Patent Literature 1, the appropriate amounts of various control values vary with production states even when various control values are made appropriate by feedback control. Accordingly, every time the production states change, the feedback control should be performed again by various control values determined by the matrix control being used as initial control values.

Accordingly, it takes time for various control values to be made appropriate by feedback control after a change in production state, and warping of the cardboard sheet cannot be sufficiently suppressed immediately after a change in production state and sheet damage cannot be avoided.

The present invention has been made in view of the above, and an object of the present invention is to provide a cardboard sheet manufacturing system with which warping of a cardboard sheet can be promptly suppressed.

Solution to Problem

A cardboard sheet manufacturing system according to the present invention includes a cardboard sheet manufacturing apparatus manufacturing a cardboard sheet, a production state information acquisition unit acquiring production state information on a production state of the cardboard sheet, an operation state information acquisition unit acquiring operation state information on an operation state of the cardboard sheet manufacturing apparatus, a control table storage unit storing a control table in which a target control value is set in accordance with the production state and the operation state, the target control value being a target value of a control value of a control element in the cardboard sheet manufacturing apparatus, a control value output unit extracting the target control value from the control table based on the acquired production state information and operation state information and outputting the target control value, a control unit controlling the control value of the control element based on the target control value output from the control value output unit, a warping state information acquisition unit acquiring warping state information on a warping state of the cardboard sheet manufactured by the cardboard sheet manufacturing apparatus, an information editing unit storing the acquired production state information, operation state information, and warping state information as acquisition information in a storage unit, the information editing unit deleting, in a case where the stored acquisition information includes prescribed information to be deleted, the information to be deleted from the storage unit and outputting the acquisition information stored in the storage unit as editing information, an editing information storage unit storing the editing information output from the information editing unit, a prediction model calculation unit calculating a prediction model of the warping state based on the editing information stored in the editing information storage unit, and a control table update unit updating the target control value of the control table based on the prediction model.

Accordingly, the information used for the calculation of the prediction model does not include the prescribed information to be deleted, and thus it is possible to calculate a prediction model that does not reflect the effect of the information to be deleted. As a result, the target control value of the control table can be updated to a precise value, and thus warping of the cardboard sheet can be promptly suppressed.

The information to be deleted may be information on a period in which the cardboard sheet manufacturing apparatus is put into a transient operation state.

Accordingly, the information on a period in which the cardboard sheet manufacturing apparatus is put into the transient operation state can be excluded during prediction model creation, and thus the target control value of the control table can be updated to a precise value.

In addition, the information editing unit may determine whether or not the cardboard sheet manufacturing apparatus is in the transient operation state based on at least one of a change in a temperature of the cardboard sheet, a change in the warping state of the cardboard sheet, a change in the production state of the cardboard sheet, and a change in a production speed of the cardboard sheet in the cardboard sheet manufacturing apparatus.

Accordingly, the information on a period in which the cardboard sheet manufacturing apparatus is put into the transient operation state can be more reliably deleted, and thus the target control value of the control table can be updated to a precise value and warping of the cardboard sheet can be promptly suppressed.

In addition, the period in which the cardboard sheet manufacturing apparatus is put into the transient operation state may include at least one of a period from acquisition of the new production state information to reaching the operation state corresponding to the new production state information in a case where a change in the production state is performed and a period from initiation of a change in the target control value until the control value reaches the target control value in a case where the target control value is changed.

Accordingly, the information on a period in which the cardboard sheet manufacturing apparatus is put into the transient operation state can be more reliably deleted, and thus the target control value of the control table can be updated to a precise value and warping of the cardboard sheet can be promptly suppressed.

In addition, the information to be deleted may include the acquisition information on a period from a point in time of ending of the transient operation state to elapse of a prescribed period.

Accordingly, the target control value of the control table can be updated to a precise value and warping of the cardboard sheet can be promptly suppressed by information immediately following the end of the transient operation state being also deleted.

In addition, the information to be deleted may be a warping state information defect.

Accordingly, it is possible to update the target control value of the control table to a precise value by excluding the warping state information defect in creating the prediction model.

In addition, the warping state information defect may include at least one of information on a case where the warping state of the cardboard sheet becomes composite warping and information on a case where a paper width of the cardboard sheet becomes equal to or less than a prescribed value.

Accordingly, information in a case where the warping state of the cardboard sheet becomes composite warping and a case where the paper width of the cardboard sheet becomes equal to or less than a prescribed value can be more reliably deleted, and thus the target control value of the control table can be updated to a precise value and warping of the cardboard sheet can be promptly suppressed.

In addition, the information editing unit may delete information becoming an outlier exceeding a prescribed range from the editing information.

Accordingly, the target control value of the control table can be updated to a precise value and warping of the cardboard sheet can be promptly suppressed.

In addition, the prediction model calculation unit may calculate the prediction model based on the production state information and the operation state information in a partial range corresponding to the target control value becoming an update target of the control table update unit in the editing information.

Accordingly, it is possible to quickly and efficiently generate a prediction model by narrowing down the information used for prediction model calculation.

In addition, the operation state information may include worker input information input by a worker and the prediction model calculation unit may calculate the prediction model by using the worker input information with higher priority than the other operation state information.

Accordingly, a worker's sensitive information can be reflected in the calculation of the prediction model, and thus a prediction model with high precision can be generated.

Advantageous Effects of Invention

According to the present invention, it is possible to provide a cardboard sheet manufacturing system with which warping of a cardboard sheet can be promptly suppressed.

BRIEF DESCRIPTION OF DRAWINGS

FIG. 4 is a diagram illustrating an example of the determination reference at a time when an information editing unit determines whether or not a cardboard sheet manufacturing apparatus is in a transient operation state.

FIG. 8 is a diagram illustrating locations processed in the transient operation state by comparison between individual base sheets and a cardboard sheet.

FIG. 9 is a diagram illustrating an example of acquisition information and editing information.

FIG. 14 is a diagram illustrating an example of the operation of selecting data to be used in a case where a prediction model calculation unit calculates a prediction model.

DESCRIPTION OF EMBODIMENTS

Hereinafter, an embodiment of a cardboard sheet manufacturing system according to the present invention will be described with reference to the drawings. It should be noted that the present invention is not limited by this embodiment. In addition, components in the following embodiment include those that can be easily replaced by those skilled in the art or those that are substantially the same.

Figure 1:
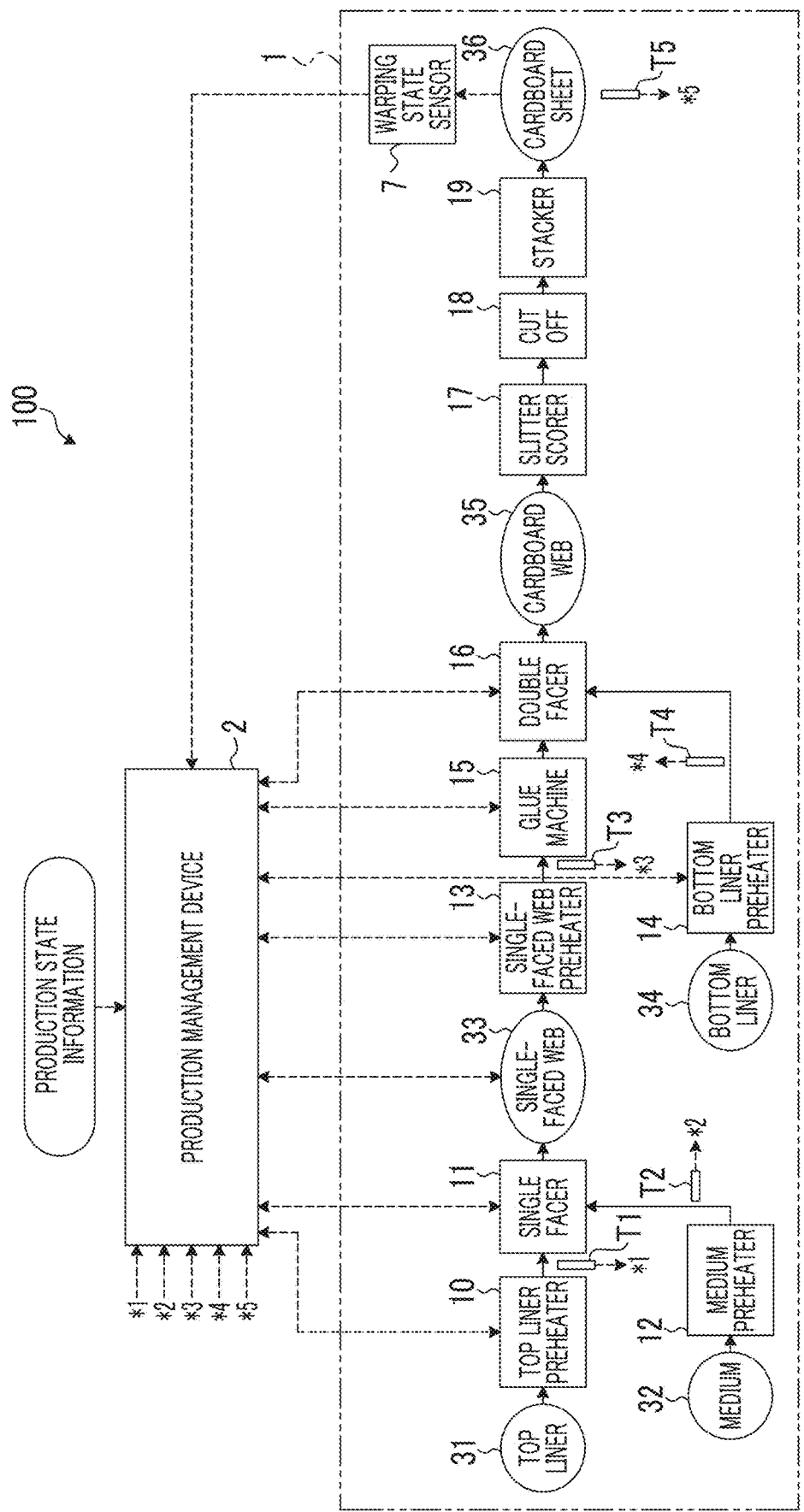
FIG. 1 is a schematic diagram illustrating an overall configuration of a cardboard sheet manufacturing system according to the present embodiment.

FIG. 1 is a schematic diagram illustrating an overall configuration of a cardboard sheet manufacturing system 100 according to the present embodiment. The cardboard sheet manufacturing system 100 includes a cardboard sheet manufacturing apparatus 1 and a production management device 2 that controls the cardboard sheet manufacturing apparatus 1.

The cardboard sheet manufacturing apparatus 1 includes a top liner preheater 10, a single facer 11, a medium preheater 12, a single-faced web preheater 13, a bottom liner preheater 14, a glue machine 15, a double facer 16, a slitter scorer 17, a cutoff 18, a stacker 19, a warping state sensor 7, and temperature sensors T1, T2, T3, T4, and T5.

The top liner preheater 10 heats a top liner 31. The medium preheater 12 heats a medium 32. In the single facer 11, the medium 32 heated by the medium preheater 12 is stepped and glued and the top liner 31 heated by the top liner preheater 10 is bonded. The single-faced web preheater 13 heats a single-faced web 33 formed by the single facer 11. The bottom liner preheater 14 heats a bottom liner 34. The glue machine 15 glues the single-faced web 33 heated by the single-faced web preheater 13. The double facer 16 creates a cardboard web 35 by bonding the bottom liner 34 heated by the bottom liner preheater 14 to the single-faced web 33 glued by the glue machine 15. The slitter scorer 17 performs vertical cutting, scoring, and the like on the cardboard web 35 created by the double facer 16. The cutoff 18 produces a cardboard sheet 36 as a final product by cutting the cardboard web 35 that has been, for example, scored by the slitter scorer 17 in a paper width direction. The warping state sensor 7 detects the warping state of the cardboard sheet 36 cut by the cutoff 18. The stacker 19 stacks the cardboard sheets 36 in the order of completion.

The temperature sensor T1 detects the temperature of the top liner 31 heated by the top liner preheater 10. The temperature sensor T2 detects the temperature of the medium 32 heated by the medium preheater 12. The temperature sensor T3 detects the temperature of the single-faced web 33 heated by the single-faced web preheater 13. The temperature sensor T4 detects the temperature of the bottom liner 34 heated by the bottom liner preheater 14. The temperature sensor T5 detects the temperature of the cardboard sheet 36 cut at the cutoff 18. The detection results of the temperature sensors T1, T2, T3, T4, and T5 are input to the production management device 2.

Here, the top liner 31, the medium 32, the single-faced web 33, and the bottom liner 34 correspond to a base sheet in the present embodiment. Hereinafter, the top liner 31, the medium 32, the single-faced web 33, and the bottom liner 34 will be respectively described as base sheets 31, 32, 33, and 34 in a case where the top liner 31, the medium 32, the single-faced web 33, and the bottom liner 34 are not distinguished.

Figure 2:
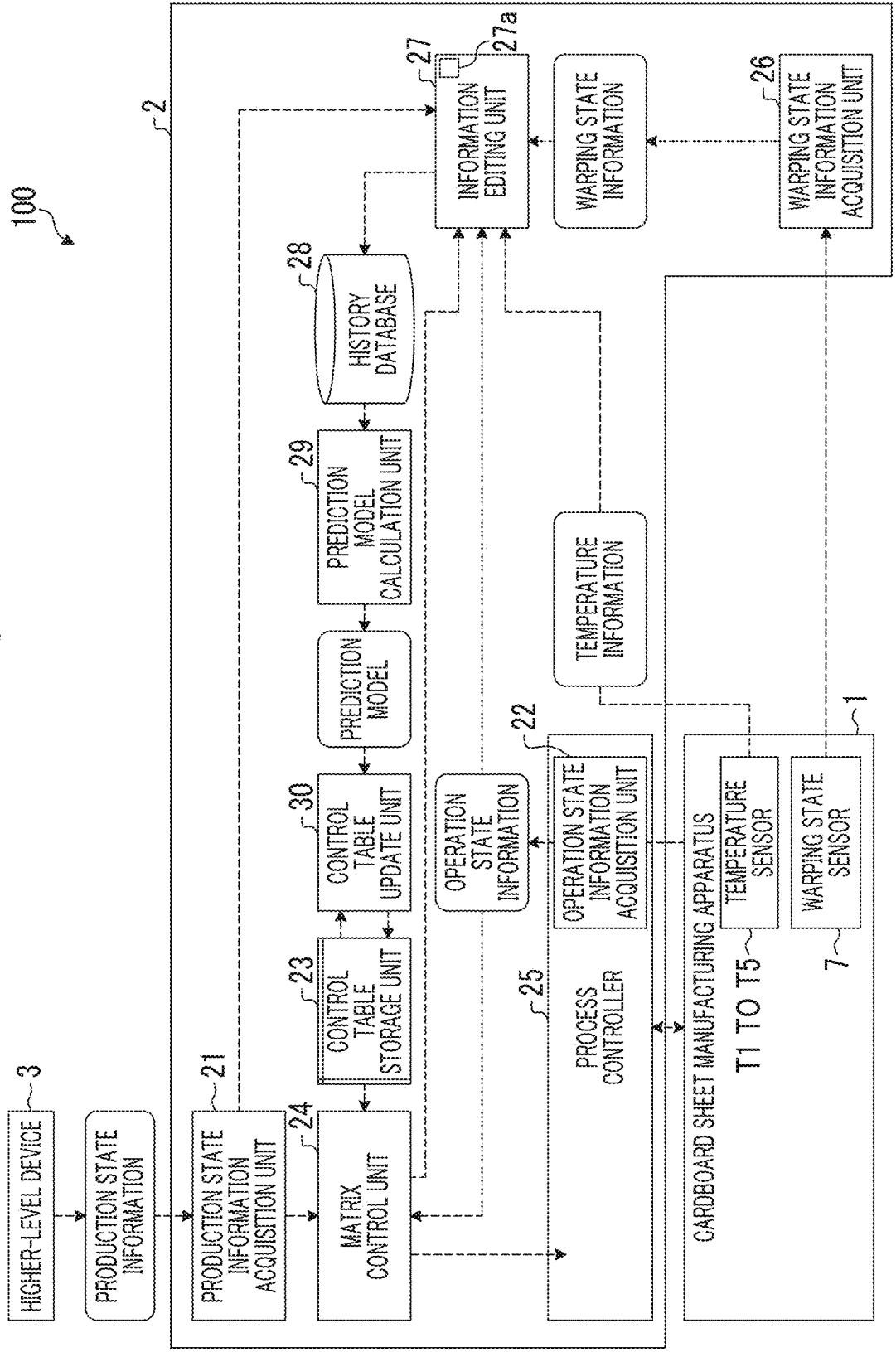
FIG. 2 is a block diagram illustrating an example of a production management device.

FIG. 2 is a block diagram illustrating an example of the production management device 2. As illustrated in FIG. 2, the production management device 2 has a production state information acquisition unit 21, an operation state information acquisition unit 22, a control table storage unit 23, a matrix control unit (control value output unit) 24, a process controller (control unit) 25, a warping state information acquisition unit 26, an information editing unit 27, a history database (acquisition information storage unit) 28, a prediction model calculation unit 29, and a control table update unit 30.

The production state information acquisition unit 21 acquires production state information from a higher-level production management system (hereinafter, referred to as a higher-level device 3). The production state information includes information on, for example, the materials (paper widths, basis weights, and the like) and flutes of the base sheets 31, 32, 33, and 34.

The operation state information acquisition unit 22 acquires operation state information from the cardboard sheet manufacturing apparatus 1. Although the operation state information acquisition unit 22 is included in, for example, a part of the process controller 25, the present invention is not limited thereto and the operation state information acquisition unit 22 may be provided separately from the process controller 25. The operation state information is information indicating the operation state of the cardboard sheet manufacturing apparatus 1. The operation state of the cardboard sheet manufacturing apparatus 1 includes, for example, the production speed of the cardboard sheet 36 and control values at a time of operation regarding control elements of the cardboard sheet manufacturing apparatus 1. Here, the control elements of the cardboard sheet manufacturing apparatus 1 include, for example, the amount of winding (°) around the base sheet in the top liner preheater 10, the medium preheater 12, the single-faced web preheater 13, and the single-faced web preheater 14, the amount of a gap with respect to the base sheet in the single facer 11 and the glue machine 15, and a pressurizing force applied to the base sheet in the double facer 16.

Figure 3:
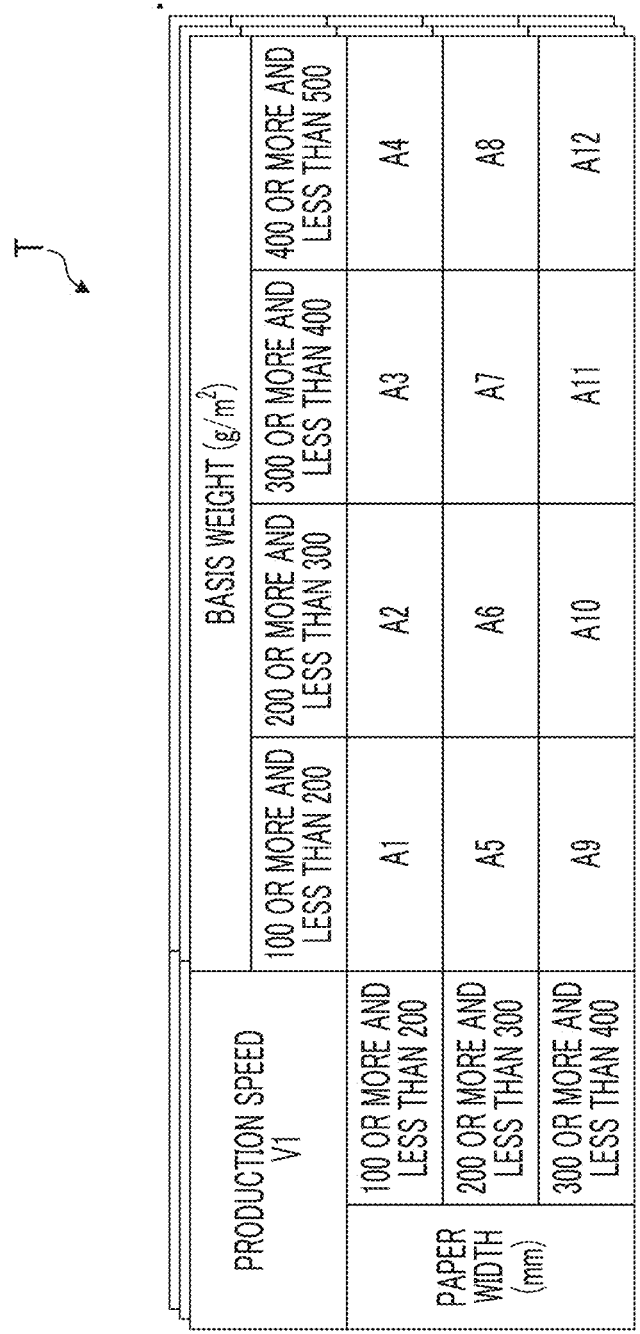
FIG. 3 is a diagram illustrating an example of a control table.

The control table storage unit 23 stores a control table. The control table is a data table in which target control values are set in accordance with production and operation states (such as the production speed). The target control values are target values of the control values of the above-described control elements in the cardboard sheet manufacturing apparatus 1. FIG. 3 is a diagram illustrating an example of a control table T. FIG. 3, which is a two-dimensional table, shows target control values of the amount of winding (°) around the base sheet in the top liner preheater 10, the medium preheater 12, the single-faced web preheater 13, and the single-faced web preheater 14 depending on the paper width (mm) and basis weight (g/m$^2$) of the base sheet. Such a two-dimensional table is set in accordance with production speeds V1, . . . , which are an operation state.

The production state information acquired by the production state information acquisition unit 21 and the operation state information acquired by the operation state information acquisition unit 22 are input to the matrix control unit 24. The matrix control unit 24 extracts a target control value from the control table based on the input production state information and operation state information and outputs the target control value. For example, in the case of the above-described winding amount as an example, the matrix control unit 24 extracts and outputs a target control value μl in accordance with the control table illustrated in FIG. 3 in a case where the paper width is 150 (mm), the basis weight is 150 (g/m$^2$), and the production speed is V1. In this manner, the matrix control unit 24 extracts a target control value in accordance with the input production state information and operation state information from the control table and outputs the target control value. The matrix control unit 24 performs such processing for each control element of the cardboard sheet manufacturing apparatus 1.

The target control value output from the matrix control unit 24 is input to the process controller 25. The process controller 25 controls each control element of the cardboard sheet manufacturing apparatus 1 based on the target control value. The process controller 25 integrally controls each component of the cardboard sheet manufacturing apparatus 1.

The warping state information acquisition unit 26 acquires warping state information on the warping state (such as the warping amount) of the cardboard sheet 36 manufactured by the cardboard sheet manufacturing apparatus 1. The detection result from the warping state sensor 7 is input to the warping state information acquisition unit 26. Measuring equipment such as a laser distance sensor and a CCD camera can be used as the warping state sensor 7. The warping state information acquisition unit 26 calculates the warping state information on the warping state of the cardboard sheet 36 based on the input detection result and outputs the calculated warping state information.

Input as acquisition information to the information editing unit 27 are the production state information acquired by the production state information acquisition unit 21, the operation state information acquired by the operation state information acquisition unit 22, and the warping state information acquired by the warping state information acquisition unit 26. The information editing unit 27 has a storage unit 27a that stores the input acquisition information. The information editing unit 27 generates editing information in which information to be deleted has been deleted from the acquisition information stored in the storage unit 27a and outputs the generated editing information.

The information to be deleted includes information on a period in which the cardboard sheet manufacturing apparatus 1 is put into a transient operation state in the acquisition information. The period in which the cardboard sheet manufacturing apparatus 1 is put into the transient operation state includes at least one of the period from the initiation to the completion of a change in production state in a case where the change in production state is performed (hereinafter, referred to as a first period) and the period from the initiation of a change in target control value until the control value reaches the target control value in a case where the target control value is changed (hereinafter, referred to as a second period).

As for the first period, the production state information output from the higher-level device 3 is changed in the case of a change in the production state (paper width, basis weight, cutting method, and the like) of the cardboard sheet 36 to be produced, that is, in the case of a change in order. In this case, the production state information input from the production state information acquisition unit 21 is changed. The target control value extracted from the control table by the matrix control unit 24 may be changed by the production state information being changed. In this case, the process controller 25 controls the cardboard sheet manufacturing apparatus 1 based on a new target control value. In the cardboard sheet manufacturing apparatus 1, the control value of each control element reaches the new target control value after some hiatus due to physical constraints.

In this regard, the information editing unit 27 detects a change in production state information by monitoring the production state information input from the production state information acquisition unit 21. In a case where a change in production state information is detected, the information editing unit 27 determines that the transient operation state is initiated at the point in time when the change in production state information is detected.

Meanwhile, the information editing unit 27 detects a change in target control value by acquiring the target control value output from the matrix control unit 24. As a result, the information editing unit 27 is capable of determining whether or not a new target control value has been output in accordance with a change in production state information. In a case where the information editing unit 27 determines that a new target control value has been output in accordance with a change in production state information, the information editing unit 27 detects whether or not the control value of the control element corresponding to the changed target control value has reached the target control value in the cardboard sheet manufacturing apparatus 1 by monitoring the operation state information input from the operation state information acquisition unit 22. The information editing unit 27 determines that the transient operation state has ended at the point in time when the control value of the control element has reached the new target control value.

As for the second period, the operation state may be manually changed by, for example, a worker of the cardboard sheet manufacturing apparatus 1. In addition, the target control value of the control table may be changed as described later. The target control value output from the matrix control unit 24 is changed in a case where the operation state in the cardboard sheet manufacturing apparatus 1 is changed in this manner, that is, in a case where at least one of the production speed of the cardboard sheet 36 and the control value of each control element is changed. Also in this case, in the cardboard sheet manufacturing apparatus 1, the control value of each control element reaches a new target control value after some hiatus due to physical constraints.

In this regard, the information editing unit 27 detects a change in target control value by acquiring the target control value output from the matrix control unit 24. In a case where a change in target control value is detected, the information editing unit 27 determines that the transient operation state is initiated at the point in time when the change in target control value has been detected. In addition, after detecting the change in target control value, the information editing unit 27 detects whether or not the control value of the control element corresponding to the changed target control value has reached the target control value in the cardboard sheet manufacturing apparatus 1 by monitoring the operation state information input from the operation state information acquisition unit 22. The information editing unit 27 determines that the transient operation state has ended at the point in time when the control value of the control element has reached the new target control value.

In addition, the information editing unit 27 is capable of determining the first period and the second period of the transient operation state based on, for example, a change in the warping state of the cardboard sheet 36 or a change in the temperature of the cardboard sheet 36. In the above-described transient operation state, the target control value output from the matrix control unit 24 is changed and the control value of the control element of the cardboard sheet manufacturing apparatus 1 reaches the new target control value after some hiatus in both the first period and the second period. In other words, in the transient operation state, a change in the control value of the control element starts at a certain point in time and the control value becomes constant at the point in time when the control value has reached a new target value. At least one of the warping state and temperature of the cardboard sheet 36 changes in a case where the control value of the control element changes in this manner. In this regard, the information editing unit 27 determines the period of the transient operation state based on, for example, a change in the warping state of the cardboard sheet 36 or a change in the temperature of the cardboard sheet 36.

In a case where the warping state changes, for example, the warping state information input from the warping state information acquisition unit 26 is changed. Accordingly, the information editing unit 27 detects whether or not the warping state of the cardboard sheet 36 has changed by monitoring the warping state information input from the warping state information acquisition unit 26. In addition, in a case where the temperature of the cardboard sheet 36 changes, for example, the detection result detected by the temperature sensor T5 changes. Accordingly, the information editing unit 27 detects whether or not the temperature of the cardboard sheet 36 has changed by acquiring and monitoring the detection result of the temperature sensor T5 as temperature information. The information editing unit 27 is capable of determining the point in time of the initiation of a change in the warping state and temperature of the cardboard sheet 36 as the point in time of the initiation of the transient operation information and is capable of determining the point in time when the change ends as the ending point in time of the transient operation information.

The information editing unit 27 is capable of determining whether or not the cardboard sheet manufacturing apparatus 1 is in the transient operation state based on, for example, at least one of a change in the temperature of the cardboard sheet 36, a change in the warping state of the cardboard sheet 36, a change in the production state of the cardboard sheet 36, and a change in the production speed of the cardboard sheet 36 in the cardboard sheet manufacturing apparatus 1. FIG. 4 is a diagram illustrating an example of the determination reference at a time when the information editing unit 27 determines whether or not the cardboard sheet manufacturing apparatus 1 is in the transient operation state. As illustrated in FIG. 4, the information editing unit 27 determines the 20-second period starting from a change in basis weight and the 20-second period starting from the time when the 20-second moving average value regarding the difference between the transport speeds in the double facer 16 and the single facer 11 has changed by ±20 (m/min) as the transient operation state in, for example, a case where the temperature change amount (absolute value) of the cardboard sheet 36 for 20 seconds exceeds 2° C. and a case where the warping change amount (absolute value) of the cardboard sheet 36 for 20 seconds exceeds 0.5 mm.

The production information may be changed even in a continuous operation state in the cardboard sheet manufacturing apparatus 1 according to the present embodiment. In addition, the four base sheets 31, 32, 33, and 34 are processed at different transport speeds by a plurality of components separated at a distance (such as the single facer 11, the glue machine 15, and the double facer 16). Accordingly, changes in warping state and temperature detected in the manufactured cardboard sheet 36 are affected by the process of the processing on each of the base sheets 31, 32, 33, and 34. Accordingly, in order to detect how a certain location of the cardboard sheet 36 has been processed, it is necessary to retroactively obtain the position of transport of each of the base sheets 31, 32, 33, and 34 in the cardboard sheet manufacturing apparatus 1.

Figure 5:
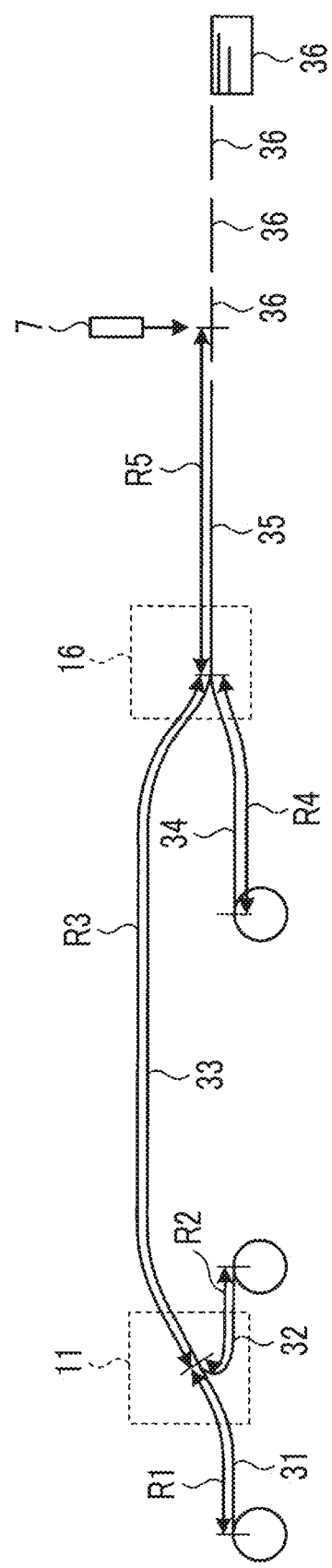
FIG. 5 is a diagram illustrating an example of transport passages in the cardboard sheet manufacturing apparatus.

FIG. 5 is a diagram illustrating an example of transport passages in the cardboard sheet manufacturing apparatus 1.

As illustrated in FIG. 5, the cardboard sheet manufacturing apparatus 1 has a first passage R1, a second passage R2, a third passage R3, a fourth passage R4, and a fifth passage R5. The first passage R1 is a passage from unrolling of the top liner 31 to bonding by the single facer 11. The second passage R2 is a passage from unrolling of the medium 32 to bonding by the single facer 11. The third passage R3 is a passage up to bonding by the double facer 16 of the single-faced web 33 bonded by the single facer 11. The fourth passage R4 is a passage up to bonding of the bottom liner 34 by the double facer 16. The fifth passage R5 is a passage up to the warping state sensor 7 measuring the warping state of the cardboard web 35 bonded by the double facer 16.

Figure 6:
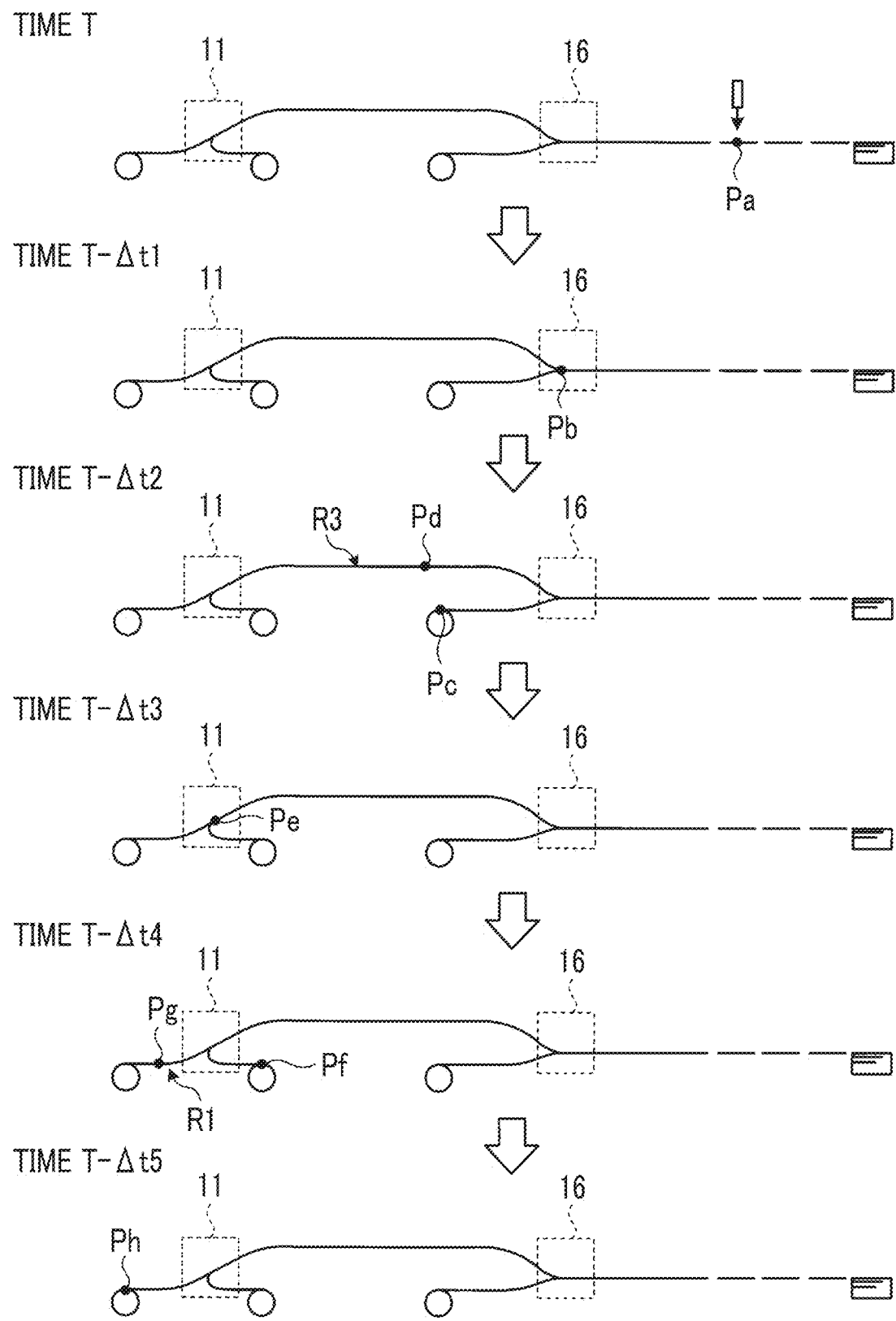
FIG. 6 is a diagram illustrating an example of a base sheet transport process in the cardboard sheet manufacturing apparatus.

FIG. 6 is a diagram illustrating an example of a base sheet transport process in the cardboard sheet manufacturing apparatus 1. As illustrated in FIG. 6, regarding a certain measurement site Pa of the cardboard web 35, the time of the point in time when the warping state is measured by the warping state sensor 7 is T. At time (T−Δt1), which precedes this time T by Δt1, a site Pb corresponding to the measurement site Pa in the single-faced web 33 and the bottom liner 34 is bonded by the double facer 16. At time (T−Δt2), which precedes time T by Δt2, a site Pc corresponding to the measurement site Pa in the bottom liner 34 is unrolled from a roll. At this time, a site Pd corresponding to the measurement site Pa in the single-faced web 33 is disposed on the third passage R3. In addition, at (T−Δt3), which precedes time T by Δt3, a site Pe corresponding to the measurement site Pa in the top liner 31 and the medium 32 is bonded by the single facer 11. In addition, at time (T−Δt4), which precedes time T by Δt4, a site Pf corresponding to the measurement site Pa in the medium 32 is unrolled from a roll. In this case, a site Pg corresponding to the measurement site Pa in the top liner 31 is disposed on the first passage R1. In addition, at time (T−Δt5), which precedes time T by Δt5, a site Ph corresponding to the measurement site Pa in the top liner 31 is unrolled from a roll. It should be noted that Δt5 exceeds Δt4, Δt4 exceeds Δt3, Δt3 exceeds Δt2, and Δt2 exceeds Δt1. In this manner, the time at which processing is performed on the site corresponding to the measurement site Pa is different in the top liner 31, the medium 32, the single-faced web 33, the bottom liner 34, and the cardboard web 35.

Figure 7:
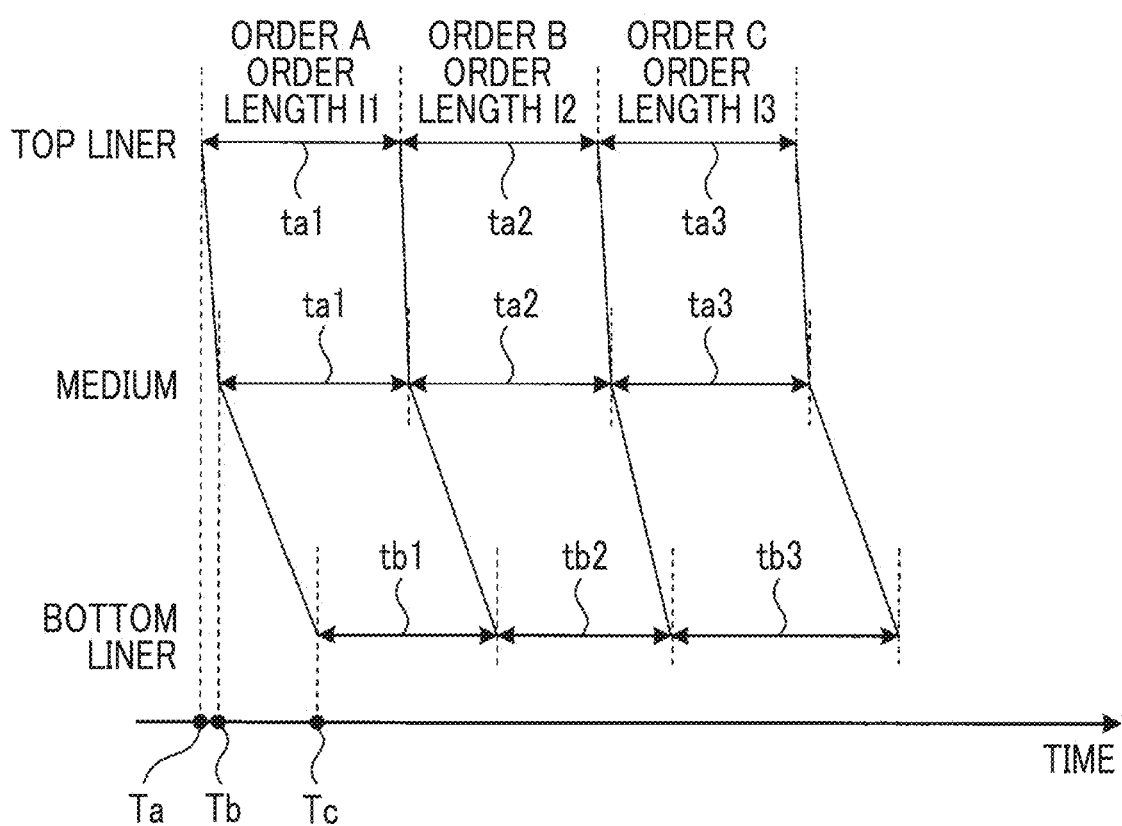
FIG. 7 is a diagram in which base sheet transport initiation times are compared.

FIG. 7 is a diagram in which base sheet transport initiation times are compared. Exemplified in FIG. 7 is a case where the different production states of an order A having an order length l1, an order B having an order length l2, and an order C having an order length l3 are continuous. As illustrated in FIG. 7, in the cardboard sheet manufacturing apparatus 1, the speed at which the top liner 31 is unrolled and the speed at which the medium 32 is unrolled depend on the transport speed at a time when the top liner 31 and the medium 32 are bonded in the single facer 11. Accordingly, in each order (orders A, B, and C), the transport time is equal between the top liner 31 and the medium 32 (ta1, ta2, and ta3). In addition, the speed at which the bottom liner 34 is unrolled depends on the transport speed at a time when the single-faced web 33 and the bottom liner 34 are bonded in the double facer 16. In addition, before and after a change in order, the production speed is adjusted in the double facer 16 so that the base sheets are appropriately bonded together. Accordingly, in each order (orders A, B, and C), the transport time of the bottom liner 34 varies with the production state (tb1, tb2, and tb3). In this manner, the top liner 31, the medium 32, and the bottom liner 34 are transported through different passages and at different transport speeds. Accordingly, an unrolling time Tb of the medium 32 is later than an unrolling time Ta of the top liner 31. In addition, an unrolling time Tc of the bottom liner 34 is later than the unrolling time Tb of the medium 32.

FIG. 8 is a diagram illustrating locations processed in the transient operation state by comparison between the individual base sheets and the cardboard sheet 36. FIG. 8 illustrates a location processed in the transient operation state (hereinafter, referred to as a transient processing location) and a location processed in a static and non-transient operation state (hereinafter, referred to as a static processing location) with regard to the top liner 31 that has passed through the first passage R1, the medium 32 that has passed through the second passage R2, the single-faced web 33 in which the top liner 31 and the medium 32 are bonded, the single-faced web 33 that has passed through the third passage R3, the bottom liner 34 that has passed through the fourth passage R4, the cardboard web 35 in which the single-faced web 33 and the bottom liner 34 are bonded, and the cardboard sheet 36 that has passed through the fifth passage R5.

As illustrated in FIG. 8, in the single-faced web 33 in which the top liner 31 and the medium 32 are bonded, the transient processing location is a location including at least one of the transient processing location of the top liner 31 (hatched location) and the transient processing location of the medium 32. Likewise, in the cardboard web 35 in which the single-faced web 33 and the bottom liner 34 are bonded, the transient processing location is a location including at least one of the transient processing location of the single-faced web 33 and the transient processing location of the bottom liner 34. Accordingly, the transient processing portion of the cardboard sheet 36 to be manufactured includes all of the respective transient processing locations of the top liner 31, the medium 32, the single-faced web 33, the bottom liner 34, and the cardboard web 35.

The history database 28 stores the editing information output from the information editing unit 27. FIG. 9 is a diagram illustrating an example of the acquisition information and the editing information. As illustrated in FIG. 9, as for acquisition information IA and editing information IB, a data set including the production state information, the operation state information, and warping information at a time when, for example, the warping state of the cardboard sheet 36 has become a prescribed state can be stored as a set of actual data sets in one order. Examples of the prescribed state in this case include a state where the warping state of the cardboard sheet 36 has become minimized, a state where the warping state has become maximized, and a state where the warping state has become an average value under the same conditions. Although FIG. 9 illustrates a state where the warping state of the cardboard sheet 36 has become minimized as an example of the prescribed state, the present invention is not limited thereto. A data set including all of the production state information, operation state information, and warping information between, for example, the case of the minimum warping state and the case of the maximum warping state may be stored regardless of whether or not the warping state of the cardboard sheet 36 is the prescribed state. In addition, although the paper width and the basis weight are exemplified as the production state information and the winding amount is exemplified as the operation state information in FIG. 9, the present invention is not limited thereto. As illustrated in FIG. 9, the editing information IB is stored in the history database 28 in a state where information to be deleted is deleted from the acquisition information IA.

The prediction model calculation unit 29 calculates a warping state prediction model based on the editing information stored in the history database 28 and outputs the calculated prediction model. For example, in a case where the prediction model calculation unit 29 generates a prediction model regarding the control value having a paper width of "100 or more and less than 200" and a basis weight of "100 or more and less than 200" in the control table, the prediction model calculation unit 29 acquires, from the editing information stored in the history database 28, an actual data set in which the paper width and the basis weight fall within these ranges. It should be noted that the range in which the prediction model calculation unit 29 acquires the actual data set is not limited thereto. For example, the lower and upper limits of the paper width and the basis weight may have any widths.

Figure 10:
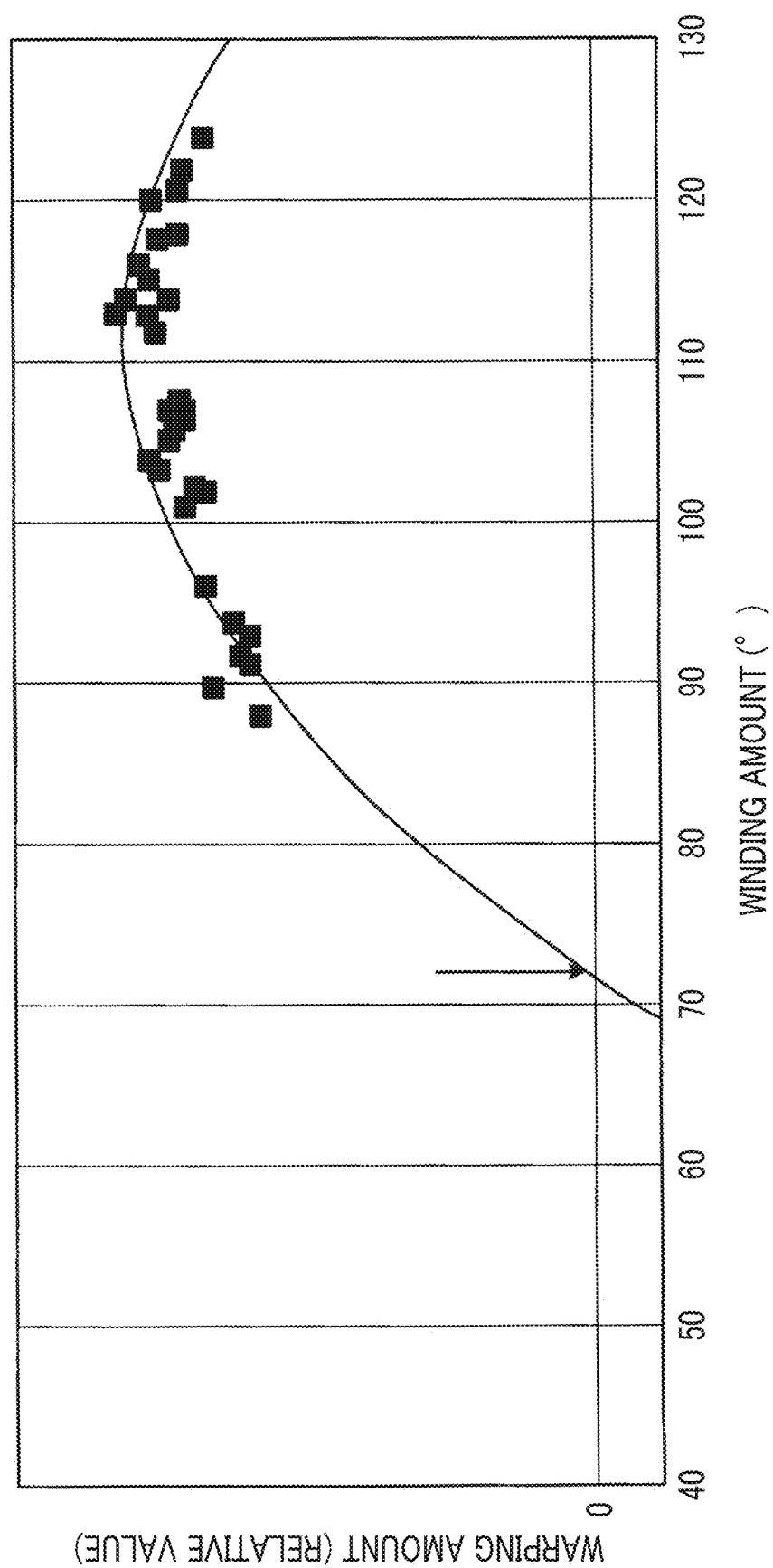
FIG. 10 is a diagram illustrating a graph illustrating the relationship between a preheater winding amount and the warping amount of the cardboard sheet.

FIG. 10 is a diagram illustrating a graph illustrating the relationship between a preheater winding amount and the warping state (warping amount) of the cardboard sheet 36. The vertical axis in FIG. 10 indicates the warping amount (relative value) of the cardboard sheet 36 and the horizontal axis in FIG. 10 indicates the preheater winding amount. In FIG. 10, the data of the acquired actual data set is indicated by black squares.

The prediction model calculation unit 29 generates a prediction model M1, which is a regression model for obtaining the warping amount of the cardboard sheet 36, based on the acquired actual data set. The prediction model M1 may be a statistical model such as a neighbor search model and a regression tree or may be a physical model. In a case where a statistical model is used, the statistical model can be obtained directly from the actual data set acquired from the history database 28. In addition, in a case where a physical model is used, an adjustment parameter is fitted such that a physical model-based prediction result matches the actual data set. The prediction model calculation unit 29 outputs the calculated prediction model M1. For example, in a case where the production state continuously changes as in the case of the basis weight, the prediction model calculation unit 29 may calculate the prediction model continuously or in small increments in accordance with the basis weight.

The prediction model M1 output from the prediction model calculation unit 29 is input to the control table update unit 30. The control table update unit 30 updates the target control value of the control table T based on the input prediction model M1. Specifically, the control table update unit 30 obtains a winding amount at which the warping amount is optimized based on the prediction model M1. In the example illustrated in FIG. 10, a winding amount θ in a case where the warping amount becomes 0 is calculated as an optimum winding amount. Then, the control table update unit 30 updates a control value A1 of the winding amount at a paper width of "100 or more and less than 200" and a basis weight of "100 or more and less than 200" in the control table T illustrated in FIG. 3 to the calculated winding amount θ. In addition, the control table update unit 30 may calculate, based on the prediction model and by linear interpolation or the like, target control values in production information and operation information for which actual data set values have not been obtained.

Figure 11:
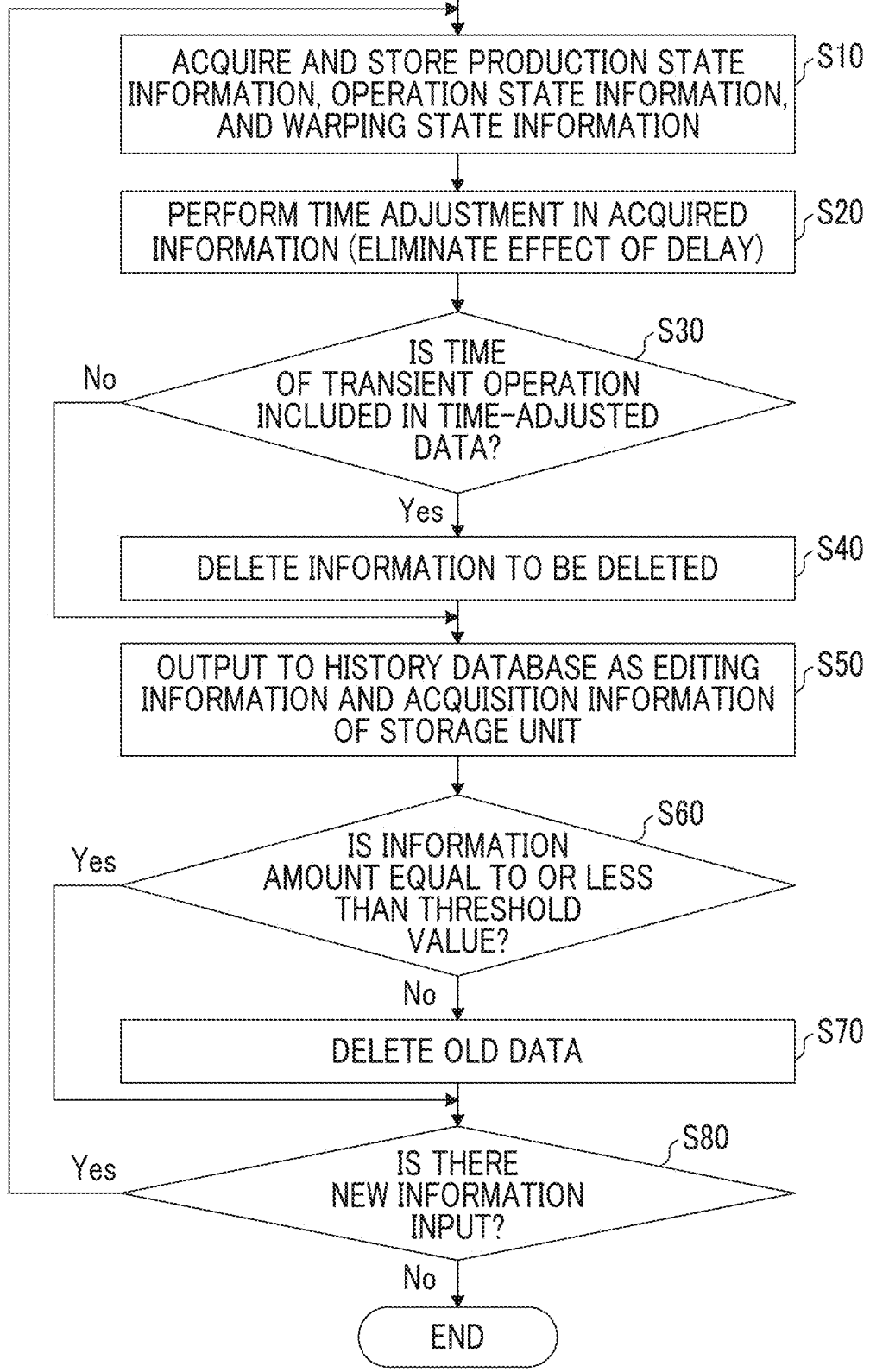
FIG. 11 is a flowchart illustrating an example of the operation of the information editing unit.

Next, the operation of the information editing unit 27 in the cardboard sheet manufacturing system 100 configured as described above will be exemplified. FIG. 11 is a flowchart illustrating an example of the operation of the information editing unit 27. As illustrated in FIG. 11, first, the information editing unit 27 acquires the production state information acquired by the production state information acquisition unit 21, the operation state information acquired by the operation state information acquisition unit 22, and the warping state information acquired by the warping state information acquisition unit 26 as acquisition information and stores the acquisition information in the storage unit 27a (Step S10).

After storing the acquisition information in the storage unit 27a, the information editing unit 27 performs time adjustment in the acquisition information (Step S20). In Step S20, the delay of the unrolling time of the top liner 31, the medium 32, and the bottom liner 34 is adjusted.

After the time adjustment, the information editing unit 27 determines whether or not the acquisition information stored in the storage unit 27a includes information on the transient operation state period (Step S30). In Step S30, the information editing unit 27 makes a determination based on the determination reference and priority of cases 1 to 4 as illustrated in, for example, FIG. 4.

In a case where the information editing unit 27 determines that the information on the transient operation state period is included (Yes in Step S30), the information editing unit 27 deletes information to be deleted including the information on the transient operation state period from the storage unit 27a (Step S40). In addition, in a case where the information editing unit 27 determines that the information on the transient operation state period is not included (No in Step S30), the process proceeds to the next step without Step S40 being performed. The information editing unit 27 outputs the acquisition information stored in the storage unit 27a to the history database 28 as editing information in each of a case where Step S40 has been performed and a case where Step S40 has not been performed with a No determination made in Step S30 (Step S50). The acquisition information output in Step S50 does not include the information on the transient operation state period.

In this case, the information editing unit 27 determines whether or not the information amount of the acquisition information stored in the history database 28 is equal to or less than a prescribed threshold value (Step S60). In a case where the information editing unit 27 determines that the information amount of the acquisition information exceeds the prescribed threshold value (No in Step S60), the information editing unit 27 deletes the acquisition information such that the information amount falls below the prescribed threshold value (Step S70). In Step S70, the information editing unit 27 is capable of deleting the acquisition information in, for example, chronological order from the oldest information. In addition, in a case where, for example, duplicate information is stored in the history database 28 as in the case of the information in the same operation state in the acquisition information, the information editing unit 27 is capable of deleting the duplicate information. In addition, in a case where the information editing unit 27 determines that the information amount of the acquisition information is equal to or less than the prescribed threshold value (Yes in Step S60), the process proceeds to the next step without the processing of Step S70 being performed.

Subsequently, the information editing unit 27 determines whether or not there is new information input (Step S80). In a case where the information editing unit 27 determines that there is the information input (Yes in Step S80), the information editing unit 27 repeats the operation from Step S10. In addition, the processing ends in a case where the information editing unit 27 determines that there is no information input (No in Step S80).

As described above, the cardboard sheet manufacturing system 100 according to the present embodiment includes the cardboard sheet manufacturing apparatus 1 manufacturing the cardboard sheet 36, the production state information acquisition unit 21 acquiring the production state information on the production state of the cardboard sheet 36, the operation state information acquisition unit 22 acquiring the operation state information on the operation state of the cardboard sheet manufacturing apparatus 1, the control table storage unit 23 storing the control table T in which the target control value, which is a target value of the control value of the control element in the cardboard sheet manufacturing apparatus 1, is set in accordance with the production and operation states, the matrix control unit 24 extracting the target control value from the control table T based on the acquired production state information and operation state information and outputting the target control value, the process controller 25 controlling the control value of the control element based on the target control value output from the matrix control unit 24, the warping state information acquisition unit 26 acquiring the warping state information on the warping state of the cardboard sheet 36 manufactured by the cardboard sheet manufacturing apparatus 1, the information editing unit 27 storing the acquired production state information, operation state information, and warping state information in the storage unit 27a as the acquisition information and, in a case where the stored acquisition information includes prescribed information to be deleted, deleting the information to be deleted from the storage unit 27a and outputting the acquisition information stored in the storage unit 27a as editing information, the history database 28 storing the editing information output from the information editing unit 27, the prediction model calculation unit 29 calculating the prediction model M1 of the warping state based on the editing information stored in the history database 28, and the control table update unit 30 updating the target control value of the control table T based on the prediction model M1.

According to this configuration, the information used for the calculation of the prediction model M1 does not include information on a period in which the cardboard sheet manufacturing apparatus 1 is put into the transient operation state, and thus it is possible to calculate a prediction model that does not reflect the effect of the information to be deleted. As a result, the target control value of the control table T can be updated to a precise value, and thus warping of the cardboard sheet 36 can be promptly suppressed.

In addition, the information to be deleted is information on a period in which the cardboard sheet manufacturing apparatus 1 is put into the transient operation state. According to this configuration, the information on a period in which the cardboard sheet manufacturing apparatus 1 is put into the transient operation state can be excluded during prediction model creation, and thus the target control value of the control table T can be updated to a precise value.

In addition, the period in which the cardboard sheet manufacturing apparatus 1 is put into the transient operation state includes at least one of a period from new production state information acquisition to reaching an operation state corresponding to the new production state information in a case where a change in production state is performed and a period from the initiation of a change in target control value until the control value reaches the target control value in a case where the target control value is changed. Accordingly, the information on a period in which the cardboard sheet manufacturing apparatus 1 is put into the transient operation state can be more reliably deleted, and thus the target control value of the control table T can be updated to a precise value and warping of the cardboard sheet 36 can be promptly suppressed.

In addition, the information editing unit 27 determines whether or not the cardboard sheet manufacturing apparatus 1 is in the transient operation state based on at least one of a change in the temperature of the cardboard sheet 36, a change in the warping state of the cardboard sheet 36, a change in the production state of the cardboard sheet 36, and a change in the production speed of the cardboard sheet 36 in the cardboard sheet manufacturing apparatus 1. Accordingly, the information on a period in which the cardboard sheet manufacturing apparatus 1 is put into the transient operation state can be more reliably deleted, and thus the target control value of the control table T can be updated to a precise value and warping of the cardboard sheet 36 can be promptly suppressed.

The technical scope of the present invention is not limited to the above embodiment and can be appropriately changed without departing from the spirit of the present invention. For example, the present invention is not limited to the above-described exemplary embodiment in which the information to be deleted by the information editing unit 27 is information on the transient operation state period. For example, the information to be deleted may include acquisition information on the period from the point in time when the transient operation state ends to the elapse of a prescribed period. In this case, the target control value of the control table T can be updated to a precise value and warping of the cardboard sheet 36 can be promptly suppressed by information immediately following the end of the transient operation state being also deleted.

Figure 12:
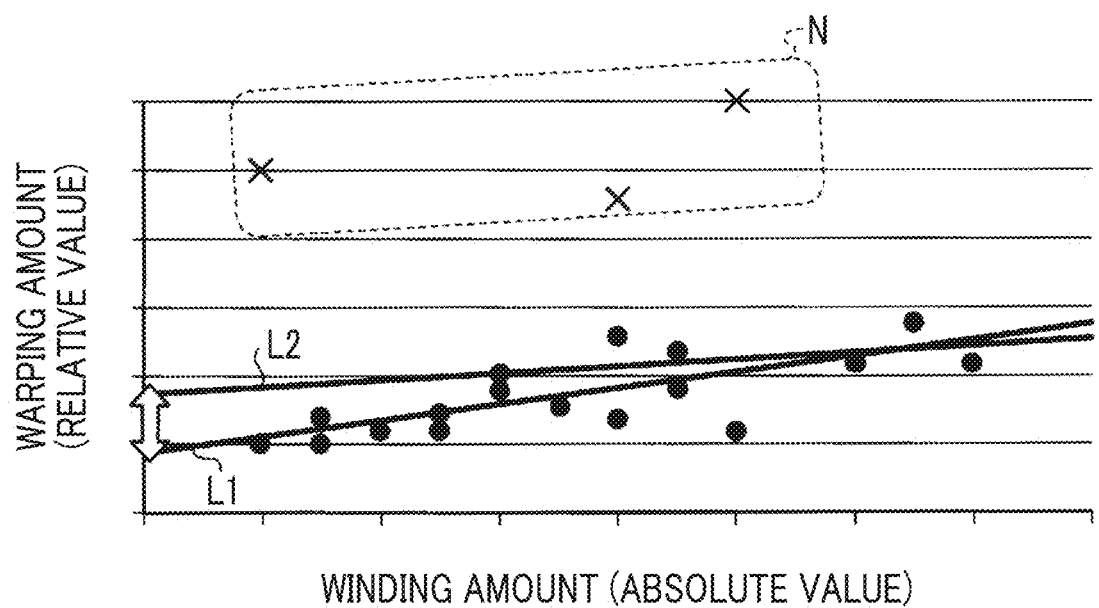
FIG. 12 is a diagram illustrating an example of a case where the information editing unit deletes an outlier.

In addition, the information editing unit 27 may include information becoming an outlier exceeding a prescribed range in the editing information stored in the history database 28. FIG. 12 is a diagram illustrating an example of a case where the information editing unit 27 deletes an outlier. In FIG. 12, the horizontal axis indicates a winding amount (°) and the vertical axis indicates a warping amount (relative value). As illustrated in FIG. 12, for example, the information editing unit 27 may delete, from the editing information stored in the history database 28, information on an outlier N in which the value of the warping amount in the case of a similar winding amount is out of a group. In this case, the information editing unit 27 is capable of updating the history database 28 after, for example, acquiring the editing information from the history database 28 and deleting information including the outlier N from the acquired editing information. As a result, for example, a more precise prediction model in a case where the outlier N is not included is indicated by a straight line L2 whereas a prediction model in a case where the outlier N is included is indicated by a straight line L1. Accordingly, the precision of the editing information stored in the history database 28 can be enhanced, and thus the target control value of the control table T can be updated to a precise value and warping of the cardboard sheet 36 can be promptly suppressed.

Figure 13:
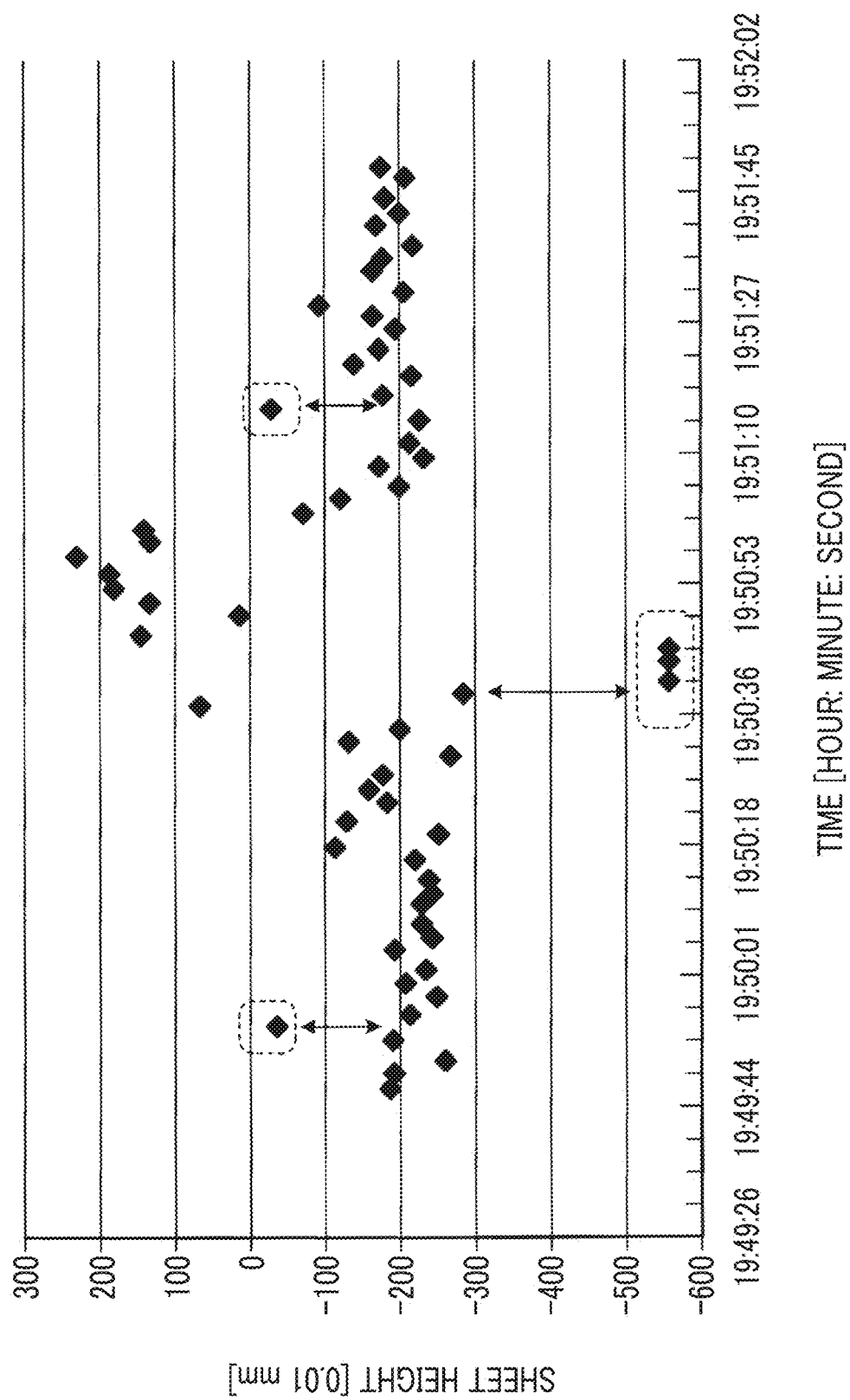
FIG. 13 is a diagram illustrating another example of a case where the information editing unit deletes an outlier.

In addition, FIG. 13 is a diagram illustrating another example of a case where the information editing unit 27 deletes an outlier. As illustrated in FIG. 13, as for the information editing unit 27, the editing information stored in the history database 28 may be information including an outlier even in a case where no appropriate measurement has been performed by measuring equipment in, for example, the cardboard sheet manufacturing apparatus 1, examples of which include a case where the warping state has been measured at the location of a creasing line of the cardboard web 35. Such information can be easily detected by the editing information being arranged in chronological order. Accordingly, as illustrated in FIG. 13, the information editing unit 27 may arrange the editing information in chronological order and delete information (part surrounded by a dotted line) that is an outlier with respect to the group. In this case, the information editing unit 27 is capable of updating the history database 28 after, for example, acquiring the editing information from the history database 28 and deleting information including an outlier from the acquired editing information. As a result, the precision of the editing information stored in the history database 28 can be enhanced, and thus the target control value of the control table T can be updated to a precise value and warping of the cardboard sheet 36 can be promptly suppressed.

Figure 15:
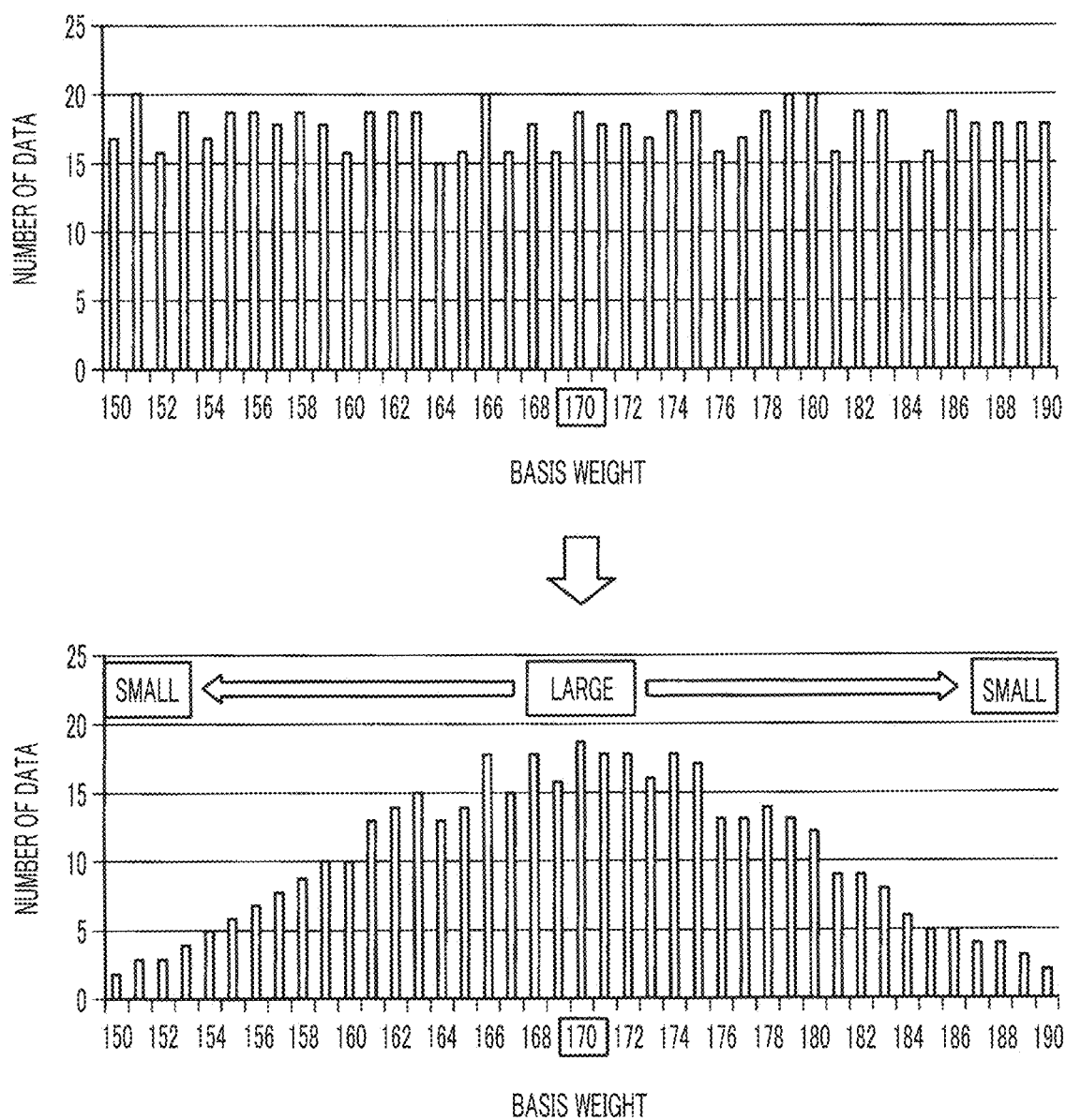
FIG. 15 is a diagram illustrating an example of the operation of selecting data to be used in a case where the prediction model calculation unit calculates the prediction model.

In addition, in calculating the prediction model M1, the prediction model calculation unit 29 does not have to perform the calculation by using every data stored in the history database 28. FIGS. 14 and 15 are diagrams illustrating an example of the operation of selecting data to be used in a case where the prediction model calculation unit 29 calculates the prediction model M1. As illustrated in FIG. 14, the prediction model calculation unit 29 may select only the production state information and the operation state information on a partial range corresponding to the production state (basis weight) and the operation state (winding amount, production speed) in a case where the prediction model M1 is calculated and calculate the prediction model M1 by using only the selected information. For example, in the case of prediction model calculation at a point having a basis weight of 170 ($g/m^2$), a winding amount of 40(%), and a production speed of 270 (mpm), data in the range in which the basis weight is 150 or more and 190 or less ($g/m^2$), the winding amount is 30 or more and 50 or less (%), and the production speed is 240 or more and 300 or less (mpm) may be collected. In addition, as illustrated in FIG. 15, the prediction model calculation unit 29 may reduce the amount of information to be selected as the distance from the point of prediction model calculation increases. In the above example, for example, more information in which the basis weight becomes 170 ($g/m^2$) is selected and less information in which the basis weight becomes 150 or 190 ($g/m^2$) is selected. It is possible to quickly and efficiently generate a prediction model by narrowing down the information used for prediction model calculation as described above.

In addition, the cardboard sheet manufacturing apparatus 1 has an operation mode in which the control table T is automatically updated by the control table update unit 30 and an operation mode in which a worker manually sets the control table T. The worker performs operation in consideration of sensitive information such as information based on his or her experience and information that cannot be measured by a device. Accordingly, the prediction model calculation unit 29 may calculate the prediction model M1 by using worker input information input by the worker with higher priority than other operation state information. As a result, a worker's sensitive information can be reflected in the calculation of the prediction model M1, and thus a precise prediction model can be generated.

In addition, the present invention is not limited to the above-described exemplary embodiment in which the control table update unit 30 directly updates the control table T stored in the control table storage unit 23. For example, the control table storage unit 23 may store, as the control table T, a preset pre-control table and a correction table in which a correction value for correcting a target control value of the pre-control table is set. In this case, the control table update unit 30 may obtain the difference between the value of the winding amount in the pre-control table and the calculated winding amount θ and update the difference as a new value in the correction table. In this case, the tendency of the target control value set in the pre-control table can be left, and thus a more precise target control value can be obtained.

In addition, the above-described embodiment may be provided with a correction amount limiting part limiting the correction value updated by the control table update unit 30 so as not to exceed a prescribed threshold value in the case of a configuration in which the preset pre-control table and the correction table in which the correction value for correcting a target control value of the pre-control table is set are stored as the control table T.

In addition, the present invention is not limited to the above-described exemplary embodiment in which the information to be deleted is information on a period in which the cardboard sheet manufacturing apparatus is put into the transient operation state. For example, the information to be deleted may be configured to include a warping state information defect. For example, in a case where the warping state of the cardboard sheet 36 is composite warping, the warping cannot be appropriately measured because the shape of the warping is complicated, and thus the information may not be suitable as information for prediction model creation. Accordingly, it is possible to update the target control value of the table T to a precise value by excluding information on a case where the warping state of the cardboard sheet 36 is composite warping as a warping state information defect in creating a prediction model. In this case, examples of the composite warping include S-shaped warping in which one end in the cardboard sheet width direction warps upward and the other end warps downward, M-shaped warping in which both ends in the cardboard sheet width direction warp downward and the central portion warps upward, W-shaped warping in which both ends in the cardboard sheet width direction warp upward and the central portion warps downward, and twist warping in which the cardboard sheet twists and warps.

In addition, for example, the information to be deleted may be a configuration including information in a case where the paper width of the cardboard sheet 36 is equal to or less than a prescribed value as a configuration including a warping state information defect. The warping state of the cardboard sheet 36 is calculated based on a measurement value of the warping state sensor 7 attached to the cardboard sheet manufacturing apparatus 1 or measuring equipment such as a laser distance sensor. In this case, the number and installation positions of the measuring equipment are fixed, and thus the warping state should be calculated based on measurement values at fewer measurement points at a smaller paper width of the cardboard sheet 36 and an error is likely to have more effect. Accordingly, it is possible to update the target control value of the table T to a precise value by excluding information on a case where the paper width of the cardboard sheet 36 is equal to or less than a prescribed value (such as 300 mm) as a warping state information defect in creating a prediction model.

It should be noted that the warping state information defect is capable of including at least one of information in a case where the warping state of the cardboard sheet 36 is composite warping and information in a case where the paper width of the cardboard sheet 36 is equal to or less than a prescribed value.

REFERENCE SIGNS LIST

1 Cardboard sheet manufacturing apparatus
2 Production management device
3 Higher-level device
7 Warping state sensor
10 Top liner preheater
11 Single facer
12 Medium preheater
13 Single-faced web preheater
14 Bottom liner preheater
15 Glue machine
16 Double facer
17 Slitter scorer
18 Cutoff
19 Stacker
21 Production state information acquisition unit
22 Operation state information acquisition unit
23 Control table storage unit
24 Matrix control unit
25 Process controller
26 Warping state information acquisition unit
27 Information editing unit
27a Storage unit
28 History database
29 Prediction model calculation unit
30 Control table update unit
31 Top liner
31, 32, 33, 34 Base sheet
32 Medium
33 Single-faced web
34 Bottom liner
35 Cardboard web
36 Cardboard sheet
100 Cardboard sheet manufacturing system
θ Winding amount
L1, L2 Straight line
M1 Prediction model
R1 First passage
R2 Second passage
R3 Third passage
R4 Fourth passage
R5 Fifth passage
T Table
T1, T2, T3, T4, T5 Temperature sensor
Pa Measurement site
Pb, Pc, Pd, Pe, Pf, Pg, Ph Site

The invention claimed is:
1. A cardboard sheet manufacturing method comprising:
manufacturing, by a cardboard sheet manufacturing apparatus, a cardboard sheet;
acquiring production state information on a production state of the cardboard sheet;
acquiring operation state information on an operation state of the cardboard sheet manufacturing apparatus;
storing a control table in which a target control value is set in accordance with the production state and the operation state, the target control value being a target value of a control value of a control element in the cardboard sheet manufacturing apparatus;
extracting the target control value from the control table based on the acquired production state information and operation state information and outputting the target control value;
controlling the control value of the control element based on the output target control value;
acquiring warping state information on a warping state of the cardboard sheet manufactured by the cardboard sheet manufacturing apparatus;
storing the acquired production state information, the operation state information, and the warping state information as acquisition information in a storage, deleting prescribed information to be deleted included in the stored acquisition information from the storage and outputting the acquisition information stored in the storage as editing information;

storing the output editing information;

calculating a prediction model of the warping state based on the stored editing information; and updating the target control value of the control table based on the prediction model, wherein the cardboard sheet manufacturing method further comprises calculating the prediction model based on the production state information and the operation state information in a partial range corresponding to the target control value becoming an update target in the editing information.

2. The cardboard sheet manufacturing method according to claim 1, wherein the information to be deleted is information on a period in which the cardboard sheet manufacturing apparatus is put into a transient operation state.

3. The cardboard sheet manufacturing method according to claim 2, wherein the period in which the cardboard sheet manufacturing apparatus is put into the transient operation state includes at least one of a period from acquisition of new production state information to reaching the operation state corresponding to the new production state information in a case where a change in the production state is performed and a period from initiation of a change in the target control value until the control value reaches the target control value in a case where the target control value is changed.

4. The cardboard sheet manufacturing method according to claim 2, further comprising determining whether or not the cardboard sheet manufacturing apparatus is in the transient operation state based on at least one of a change in a temperature of the cardboard sheet, a change in the warping state of the cardboard sheet, a change in the production state of the cardboard sheet, and a change in a production speed of the cardboard sheet in the cardboard sheet manufacturing apparatus.

5. The cardboard sheet manufacturing system method according to claim 2, wherein the information to be deleted includes the acquisition information on a period from a point in time of ending of the transient operation state to elapse of a prescribed period.

6. The cardboard sheet manufacturing method according to claim 1, wherein the information to be deleted is a warping state information defect.

7. The cardboard sheet manufacturing method according to claim 6, wherein the warping state information defect includes at least one of information on a case where the warping state of the cardboard sheet becomes composite warping and information on a case where a paper width of the cardboard sheet becomes equal to or less than a prescribed value.

8. The cardboard sheet manufacturing method according to claim 1, further comprising deleting information becoming an outlier exceeding a prescribed range from the editing information.

9. The cardboard sheet manufacturing method according to claim 1, wherein the operation state information includes worker input information input by a worker, and the cardboard sheet manufacturing method further comprises calculating the prediction model by using the worker input information with higher priority than other operation state information.

* * * * *